US011861694B1

(12) United States Patent
Mahoney et al.

(10) Patent No.: US 11,861,694 B1
(45) Date of Patent: *Jan. 2, 2024

(54) FINANCIAL AUTOPILOT (71) Applicant: United Services Automobile Association (USAA), San Antonio, TX (US)

(72) Inventors: Nathan Mahoney, New Braunfels, TX (US); Luis Daniel Silva, San Antonio, TX (US); Gunjan C. Vijayvergia, San Antonio, TX (US); Jason Paul Hendry, Selma, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 186 days.

This patent is subject to a terminal disclaimer.

(21) Appl. No.: 17/410,473

(22) Filed: Aug. 24, 2021

Related U.S. Application Data

(63) Continuation of application No. 16/585,519, filed on Sep. 27, 2019, now Pat. No. 11,127,075.

(60) Provisional application No. 62/738,544, filed on Sep. 28, 2018.

(51) Int. Cl.
*G06Q 40/02* (2023.01)
*G06Q 40/12* (2023.01)
*G06N 20/00* (2019.01)

(52) U.S. Cl.
CPC ............ *G06Q 40/02* (2013.01); *G06N 20/00* (2019.01); *G06Q 40/12* (2013.12)

(58) Field of Classification Search
None
See application file for complete search history.

(56) References Cited

U.S. PATENT DOCUMENTS

| | | |
|---|---|---|
| 2002/0091635 A1 | 7/2002 | Dilip et al. |
| 2006/0122932 A1 | 6/2006 | Birtwell et al. |
| 2010/0057616 A1 | 3/2010 | Kapur et al. |
| 2016/0048928 A1 | 2/2016 | Davis et al. |
| 2018/0101568 A1* | 4/2018 | Jones-McFadden ... G06Q 40/02 |
| 2020/0211045 A1 | 7/2020 | Tanaka |

* cited by examiner

*Primary Examiner* — Namrata Boveja
*Assistant Examiner* — Amit Patel
(74) *Attorney, Agent, or Firm* — Fish & Richardson P.C.

(57) ABSTRACT

Methods, systems, and apparatus, including computer programs encoded on computer storage media for an automated financial management system. One of the methods includes receiving data indicating a list of historic transactions of a user from a plurality of financial institutions. The method includes identifying at least one predicted unexpected expense based on providing at least some of the data to a trained machine-learning model, the trained machine-learning model trained using historic transaction data of a plurality of other users. The method includes determining a plan to account for the unexpected expense. The method also includes automatically transferring an amount based on the plan.

18 Claims, 5 Drawing Sheets

FINANCIAL AUTOPILOT

CROSS-REFERENCE TO RELATED APPLICATIONS

This application is a continuation application of and claims priority under 35 U.S.C. § 120 to U.S. application Ser. No. 16/585,519, filed on Sep. 27, 2019, which claims priority under 35 U.S.C. § 119 to U.S. Application Ser. No. 62/738,544, filed on Sep. 28, 2018, and entitled "Financial Autopilot," the entire contents of each of which are incorporated by reference herein.

BACKGROUND

A budget is a financial plan for a defined period of time, usually a year. It may also include planned sales volumes and revenues, resource quantities, costs and expenses, assets, liabilities and cash flows.

Machine-learning can encompass a wide variety of different techniques that are used to train a machine to perform specific tasks without being specifically programmed to perform those tasks.

SUMMARY

In general, one innovative aspect of the subject matter described in this specification can be embodied in methods that include the act of receiving a list of historic transactions for a user from a plurality of financial institutions. The methods can be used to create a holistic financial experience that brings together machine learning and personal financial management that enables the member to pay bills automatically, envelope savings, set and manage goals, manage the day to day needs including debt management, budgeting, money movement and advice. The methods include the act of identifying at least one predicted unexpected expense based on providing at least some of the historic transactions to a trained machine-learning model, the trained machine-learning model trained using historic transaction information for a plurality of other individuals. The methods include the act of identifying a savings plan to account for the unexpected expense. The method also includes the act of automatically transferring an amount based on the savings plan.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The methods may include the acts of identifying a set of recurring transactions based on the list of historic transactions, identifying at least one transaction in the set of recurring transaction that is not being automatically paid, and scheduling an automatic payment based on the at least one transactions. The methods may include the acts of identifying one or more categories based on the list of historic transaction, and establishing a hierarchy among the one or more categories. The methods may include the acts of enabling a user to adjust the hierarchy between the categories. The methods also include the acts of creating a financial plan for the user based at least in part on a machine-learning model.

BRIEF DESCRIPTION OF THE DRAWINGS

Like reference numbers and designations in the various drawings indicate like elements.

DETAILED DESCRIPTION

Financial advice given by conventional automated financial advice technology can be difficult to follow Even if a user of the technology is told what to do, actually doing it is can be difficult and, consequently, financial advice frequently goes unfollowed. This is partially because financial advice given by conventional technology may not account for factors that particular to the user. Thus, the advice can be unpractical, especially for younger user (for example, saving an amount equal to three to six months of expenses). Alternatively, users may find that the financial advice pushes them to make sacrifices that they do not wish to make. For example, sound financial advice given by conventional technology may suggest that a couple forgo eating out, or skipping going to the theater. However, the couple may elect to ignore the advice (and soon all such advice).

In contrast with traditional automated financial advice systems, this disclosure describes a data processing system that can automatically implement financial advice for a user. The financial advice can be determined, for example, based on a combination of conventional financial advice, goals established by the user, and a comparison between the user and financial peers of the user. In some implementations, financial strategies may be determined using machine-learning techniques. In some implementations, the user may be presented with recommendations based on similar users that have gone through life events that the user is about to enter. For example, a user who is about to have a baby may have their future financial projection adjusted based on similar users who had a baby for the first time.

Figure 1:
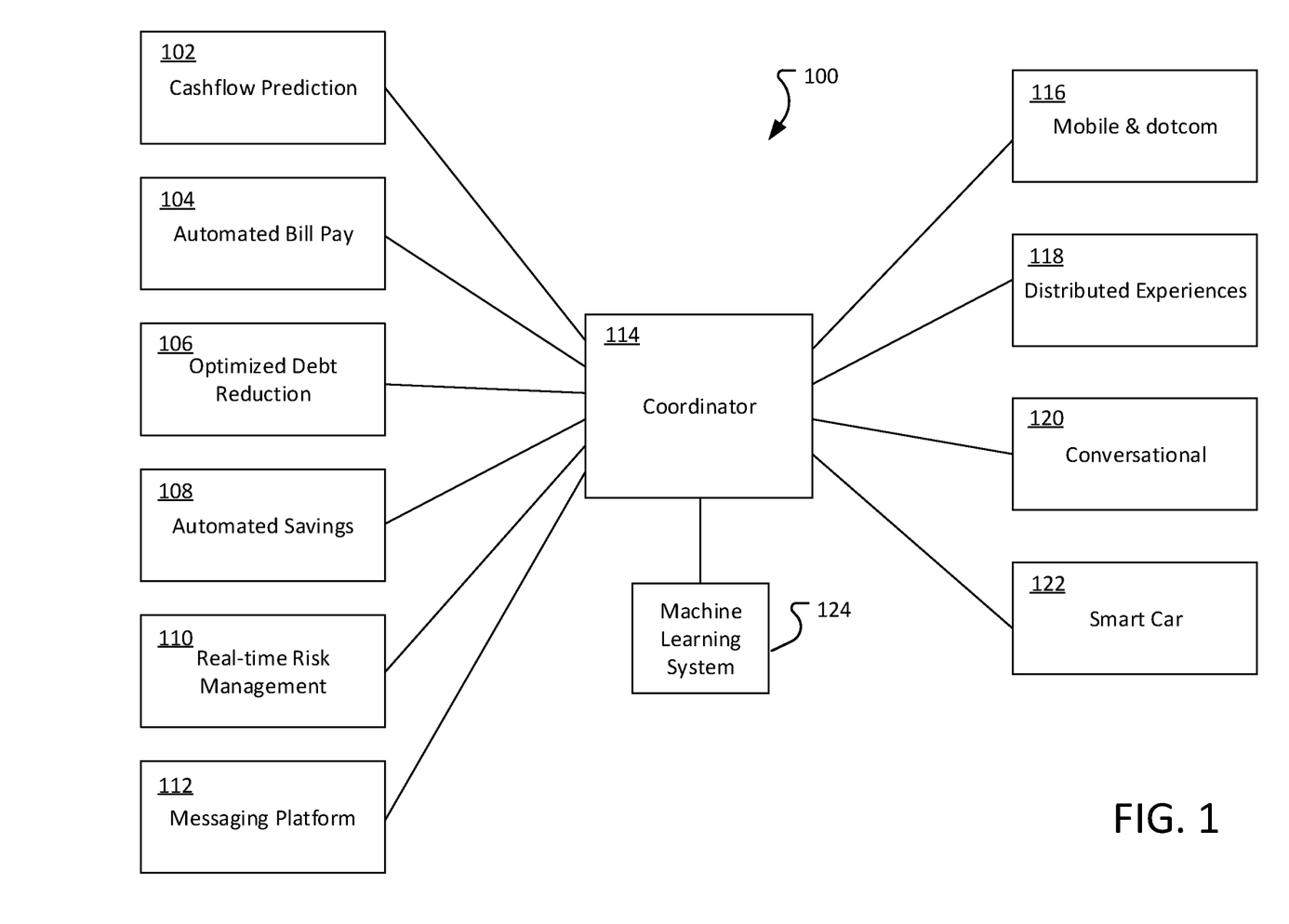
FIG. 1 illustrates an example financial autopilot system.

FIG. 1 illustrates an example financial autopilot data processing system 100. Each of these components can be implemented as computer programs or processes executed by a computer system. In some implementations, the components may be implemented as digital electronic circuitry, tangibly-embodied computer software or firmware, computer hardware (including the structures disclosed in this specification and their structural equivalents), or as one or more computer processes being execute by the computer hardware.

The system 100 includes a cash flow prediction module 102, an automated bill pay module 104, and optimized debt reduction module 106, an automated savings module 108, a real time risk management platform 110, and a messaging platform 112.

The system 100 includes a coordinator 114. The coordinator 114 is configured to interact with each of the different components to establish and enact a financial plan for a particular user. In some implementations, the coordinator 114 includes or additionally interacts with a machine-learning system, as described further below.

An user can interact with the system 100 using a variety of different channels, including through a mobile application or website 116, distributed experience 118, conversations 120 either with a customer service representative or an automated agent, including chat conversations and interactive text messages, and/or through a smart device, such as a smart car 122. A distributed experience 118 generally refers to imbedding a small portion of the experience within the larger digital ecosystem that the user is actively using. For example, advice can imbedded within a message platform, then follow the user into a shopping application to help them control spending. In general, a distributed experience 118 allows the underlying business drivers to be present in the environment or channel chosen by the users. The distributed experience 118 can evolve with the needs of the individual and/or business.

In some implementations, the system 100 is configured to put as much of a user's financial life on an optimized autopilot as possible and/or practical. In some implementations, system 100 is configured to generally handle the day to day management of the financial life of a user. However, in some implementations, the system 100 does not supersede the authority of the user and the user maintains control of their financial decisions. In some implementations, the system 100 is configured to generate recommendations, and, with permission from the user, act on those recommendations while allowing the user to maintain the ultimate say in how financial decisions are made. If the user elects to act in a manner inconsistent with the recommendations of the system 100, then the system 100 can notify the user of the projected effect of such decisions, and the system can adjust itself based on the user's desires.

Figure 2:
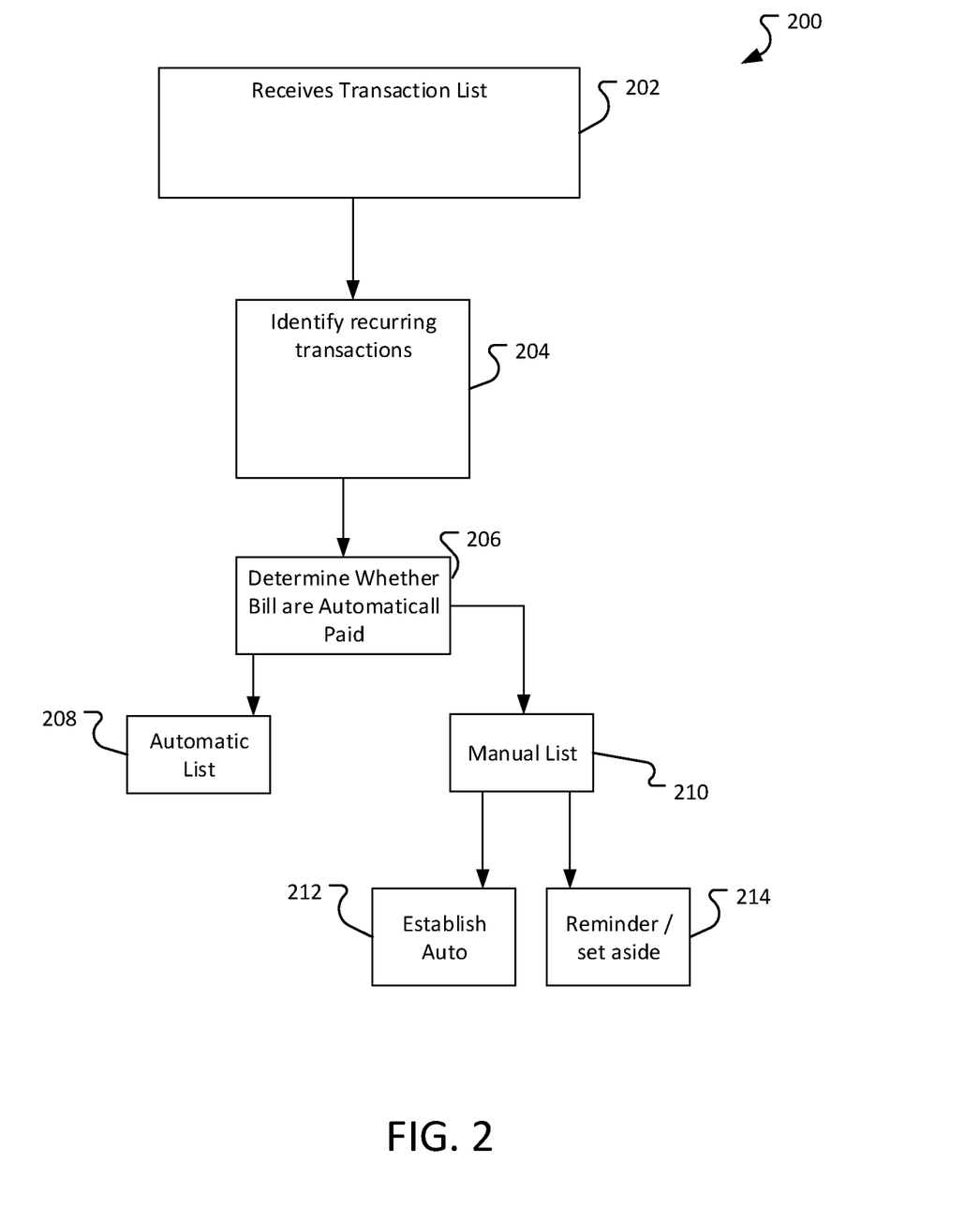
FIG. 2 illustrates an example process for identifying recurring transaction.

FIG. 2 illustrates an example process 200 for identifying recurring transaction. For illustrative purposes, the process 200 will be described as being performed by the system 100 discussed previously with reference to FIG. 1. The process 200 includes receiving data indicating a transaction list of financial transactions of the user over a predetermined period of time (block 202), for example, 18 months. In some implementations, the system 100 obtains the transaction data from multiple different financial institutions, such as, financial data aggregation platforms that facilitate contact with different institutions using authorization or credentials supplied by the user.

In some implementations, the list of financial transactions is provided to the cash flow prediction module 102 of the system 100. The cash flow prediction module 102 can analyze the transaction list and determine a bimonthly, quarterly, monthly, and/or yearly cash flow indicated by the list of financial transaction. The cash flow prediction module 102 can generate a confidence score to the cash flow prediction that accounts for captured sentiment from the user validating the accuracy of the prediction and utilize that feedback to re-enforce the prediction model.

In some scenarios, the income cycle of the user may not align with the outflow cycle. For example, the user may be paid biweekly, while their bills tend to be due monthly. In such scenarios, the system 100 can identify periods of cash excess or anticipated shortfall based on this misalignment. In some scenarios, the user's income may be unstable and unpredictable (for example, the user may be a real estate broker) but their bills remain fixed. In such scenarios, the system 100 can provide a projected financial goal for income to cover the needed expenses and help the user manage the periods between income periods and provide alerts when shortfalls are predicted. For example, the system 100 may notice a windfall income, adjust accordingly, and provide the following message to the user: "You just received a windfall bonus from helping a client in the sale of their home. You can now cover the next four months of planned expenses without additional income."

The process 200 includes identifying recurring transactions (block 204). These transactions can include subscription services, such as monthly video streaming services, debt obligations, and so forth. The system 100 can identify these transactions as recurring. For example, the user may pay rent by check each month. Some expenses may be easier to identify. For example, transactions that are scheduled to take place periodically in an automatic bill pay system may be readily identified as recurring. Identifying other transactions may be more difficult. Transactions can be identified as recurring based on a pattern of payment. For example, if the user writes a check for $300 on the fifth day of each month, then the system 100 can presume that that payment is potentially a recurring payment. Transactions can also be identified as recurring based on the payee. For example, payments to subscription services such as a newspaper, magazine, or streaming video service are likely to be potentially recurring. It is useful to note that a recurring payment is not always the same amount. For example, utilities such as gas and electric may vary from month to month and may experience some seasonality changes (for example, heating expenses may be higher in the winter). The system 100 can develop an estimate of variable expenses that account for things such as water and electrical that vary from month to month and season to season. Other recurring, but less consistent, transactions can also be flagged (for example, payments to babysitters, lawn mowing service, and so forth).

In some implementations, the system 100 can present the potentially recurring payments to the user. The system 100 can ask the user to verify that these are in fact recurring payments.

Once the recurring payments are identified, the system 100 compares the recurring transactions against a bill payment discovery engine to determine if the bills are automatically being paid (block 206). The system 100 divides the recurring transactions into an automatic list (block 208). The automatic list can include transactions that are already being paid automatically and a manual list (block 210), which can include the remaining recurring transactions. The system 100 automates payment for as many of the remaining recurring transactions as possible (block 212), using the automated bill payment module 104. If the system 100 is unable to schedule automatic payment, the system 100 can schedule regular reminders (block 214). The reminders can be sent to a device of the user for example, using e-mail, SMS messages, push notifications, etc.

The system 100 can also use available cash flow to optimize debt reduction. In some implementations, the system 100 provides an intelligent recommendation on the amount above the minimum payment that should be paid and tracks and automatically discharges the payment every single month with little or no attention required by the user. In circumstances where the system 100 is unable to make the recommended payment (that is, the amount over the minimum required payment) the system 100 can notify the user (for example, by transmitting an alert to a device of the user). This may occur, for example, if an unexpended expense arises that cannot otherwise be paid. In some implementations, the system 100 adjusts in accordance with the needs of the user. For example, the system 100 can cover an unexpected expense by reducing the planned entertainment spending by half, draw on the emergency savings (as well as the amount usually transferred to that savings each month), and then recommend the best financial credit product to absorb the remaining amount due. The next month, the system 100 can return to the previous plan with an adjustment made for the new debt load and lower savings amount. Accordingly, the system 100 can assist the user to adjust to unexpected expenses in an desired manner and continue to take several actions with the user's permission.

Figure 3:
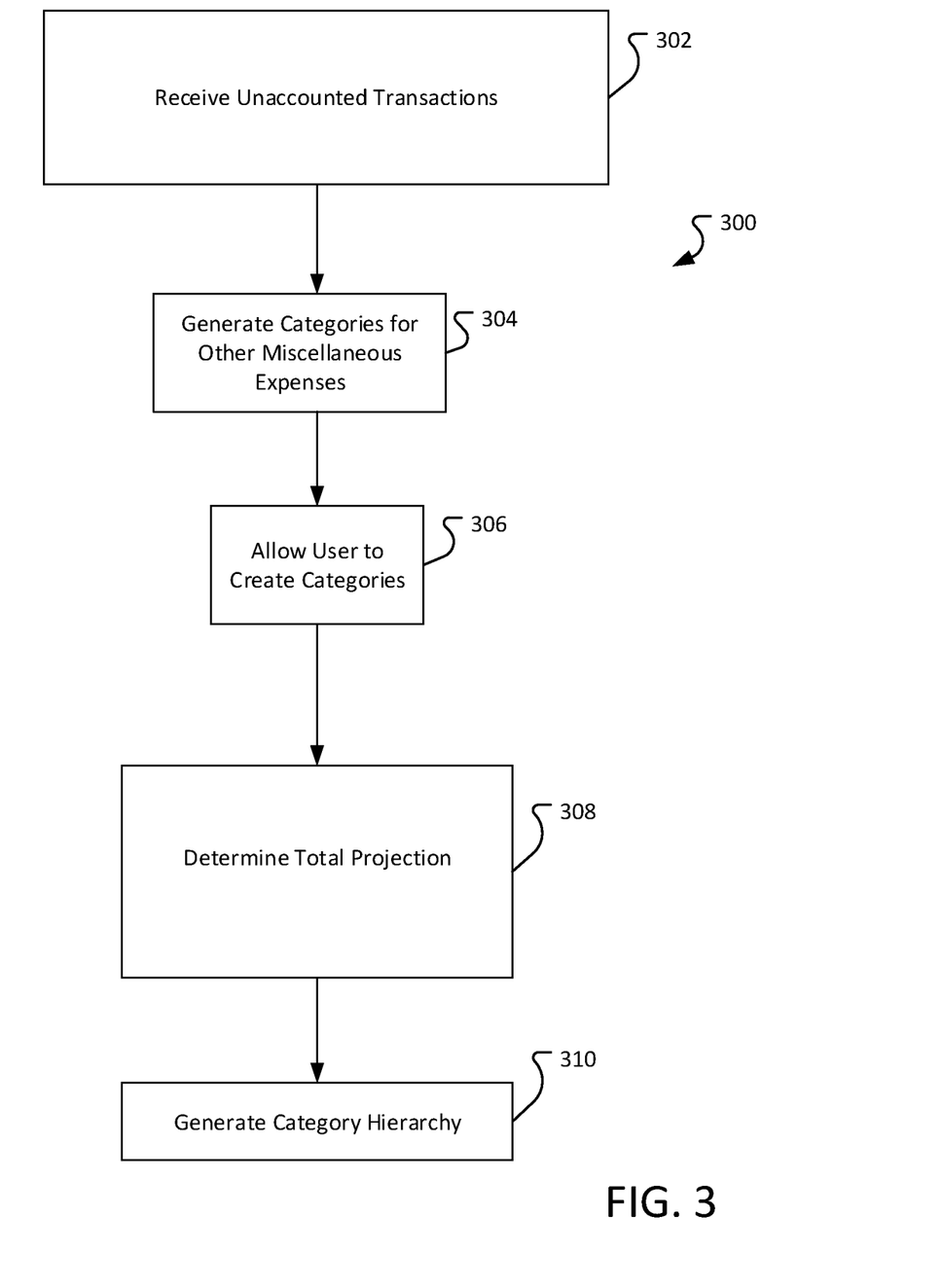
FIG. 3 illustrates an example process for categorizing transactions.

FIG. 3 illustrates an example process 300 for categorizing transactions. Once the system 100 accounts for recurring payment and debt reduction, the system 100 receives the transactions for which were unaccounted (block 302) and generates categories for other miscellaneous expenses (block 304).

These categories may be budgeted based on a bimonthly or monthly schedule. Initially the system may create only a relatively small number of categories (such as groceries, gas, etc.). In some implementations, the system 100 can allow a user to create additional categories as desired (block 306). In some implementations, categories are created by using a clustering algorithm on unaccounted for transactions in the transaction history. The system 100 then determines a total budget projection (block 308). In some implementations, to determine a total budget projection, the system 100 accounts for expenditures over time (for example, 3 months, 6 months, 12 months), seasonality, and the created categories. For example, the system 100 can determine that the user spends money on concerts in the summer, but not in the winter.

The system 100 generates an automated hierarchy between the categories (block 310). For example, expenditures associated with groceries and gas can be ranked higher than expenditures associated with a wine collection. If an additional unanticipated expense that alters the cash flow occurs during a month, the system 100 can automatically deduct the payment for that expense from the lowest ranked category. Transactions that can be ranked and grouped by category for variable amounts can be broken down and applied in time-based increments. In some implementations, the system 100 allows the user to adjust the category rankings manually. For example, the user can rank the wine collection category higher than the gas category.

Figure 4:
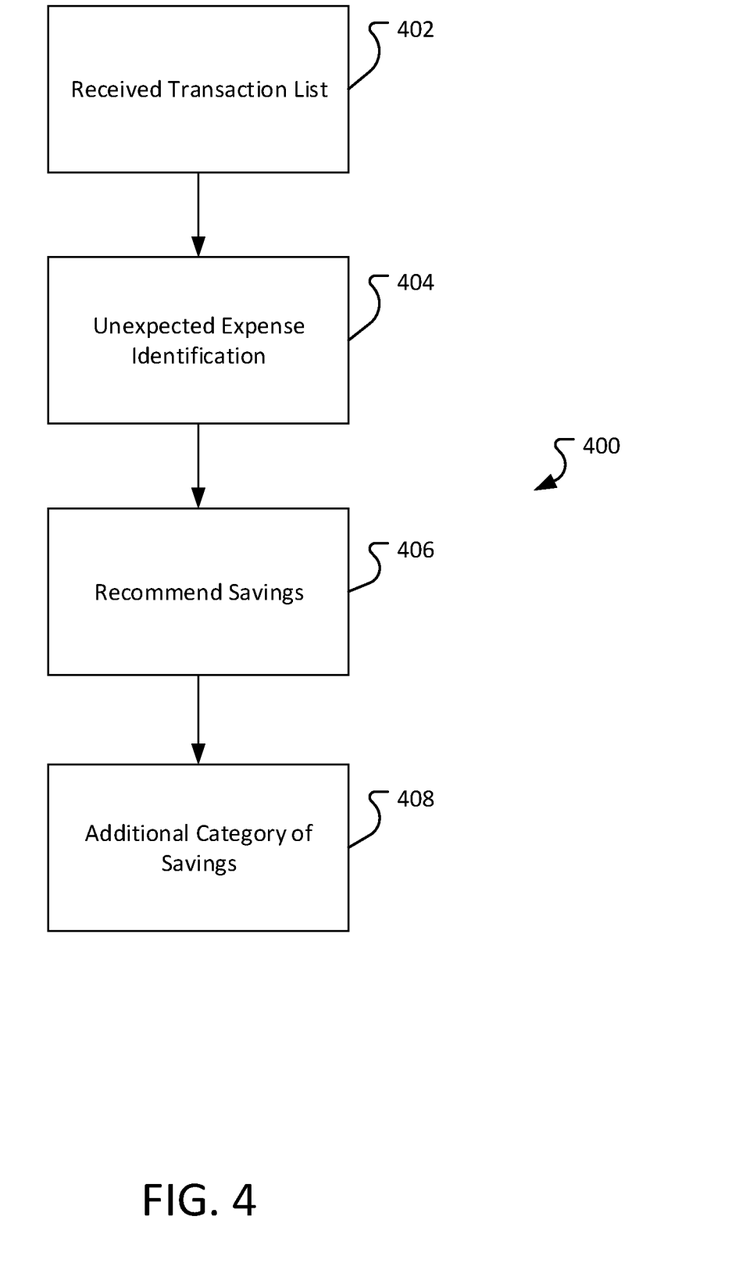
FIG. 4 illustrates an example process for planning for unexpected expenses.

FIG. 4 illustrates an example process 400 for planning for unexpected expenses. Once the system 100 has established budgeting categories, the system 100 can determine an allowance or unexpected expenses. While some common financial advice recommends maintaining a balance of at least 3 to 6 months of expenses, this advice may not be practicable for all users. Instead, can be more advantageous to start with saving enough to account for a reasonable unexpected expense. The system 100 receive the transaction list (block 402). The system 100 identifies a potential unexpected expense (block 404). In some implementations, the potential unexpected expense is based, at least in part, on the transaction list. For example, the system 100 can identify from the transaction list that the user is making car payments and can determine an allowance for car repair costs.

In some implementations, the system 100 uses machine-learning techniques in order to determine an amount and frequency of unexpected expenses. For example, a machine-learning system, may compare the user to other users in a similar socioeconomic situation and use historic data from the collective group of users to determine the amount of unexpected expenses that regularly occur in the amount of those expenses. For example, the machine-learning system can determine that a user in a particular socioeconomic situation can expect to have $125 in unexpected expenses every other month based on other users in a substantially similar socioeconomic situation. In some implementations, the system 100 uses machine-learning techniques to predict a socioeconomic situation for the user based on a variety of factors corresponding to the user (such as age, recent transactions, income, and so forth).

Generally, machine-learning can encompass a wide variety of different techniques that are used to train a machine to perform specific tasks without being specifically programmed to perform those tasks. The machine can be trained using different machine-learning techniques, including, for example, supervised learning, unsupervised learning, and reinforcement learning. In supervised learning, inputs and corresponding outputs of interest are provided to the machine. The machine adjusts its functions in order to provide the desired output when the inputs are provided. Supervised learning is generally used to teach a computer to solve problems in which are outcome determinative, for example, the training set may be used to train the trained machine-learning model to predict an expected frequency and amount of an unexpected expense over a period of time. In contrast, in unsupervised learning inputs are provided without providing a corresponding desired output. Unsupervised learning is generally used in classification problems such as, customer segmentation (for example, segmenting patients into different groups based on characteristics associated with hypoglycemic events). Reinforcement learning describes an algorithm which a machine makes decisions using trial and error. Feedback informs the machine when a good choice or bad choice is made. The machine then adjusts its algorithms accordingly. For example, the trained learning model may be embodied as a generalized linear model (GLM). Different types of generalized linear models may be appropriate in various scenarios. A zero-inflated negative binomial generalized linear regression may be used because it models a discrete count of events (such as unexpected expenses) occurring in a given time period, by estimating the per-patient hypoglycemic event rates most likely to have resulted in the hypoglycemic counts seen in the data. In some implementations, the model may use a Poisson GLM. A Poisson GLM is well suited to modeling discrete counts but does not allow for 'over-dispersion' (i.e. it constrains the variance to be equal to the mean). The Poisson GLM used the number of hypoglycemic events as the target variable (outcome) and the length of observation as an offset variable.

In another example, the trained learning model may be embodied as an artificial neural network. Artificial neural networks (ANNs) or connectionist systems are computing systems inspired by the biological neural networks that constitute animal brains. An ANN is based on a collection of connected units or nodes, called artificial. Each connection, like the synapses in a biological brain, can transmit a signal from one artificial neuron to another. An artificial neuron that receives a signal can process it and then signal additional artificial neurons connected to it.

In common ANN implementations, the signal at a connection between artificial neurons is a real number, and the output of each artificial neuron is computed by some non-linear function of the sum of its inputs. The connections between artificial neurons are called 'edges'. Artificial neurons and edges may have a weight that adjusts as learning proceeds (for example, each input to an artificial neuron may be separately weighted). The weight increases or decreases the strength of the signal at a connection. Artificial neurons may have a threshold such that the signal is only sent if the aggregate signal crosses that threshold. The transfer functions along the edges usually have a sigmoid shape, but they may also take the form of other non-linear functions, piecewise linear functions, or step functions. Typically, artificial neurons are aggregated into layers. Different layers may perform different kinds of transformations on their inputs. Signals travel from the first layer (the input layer), to the last layer (the output layer), possibly after traversing the layers multiple times.

Figure 5:
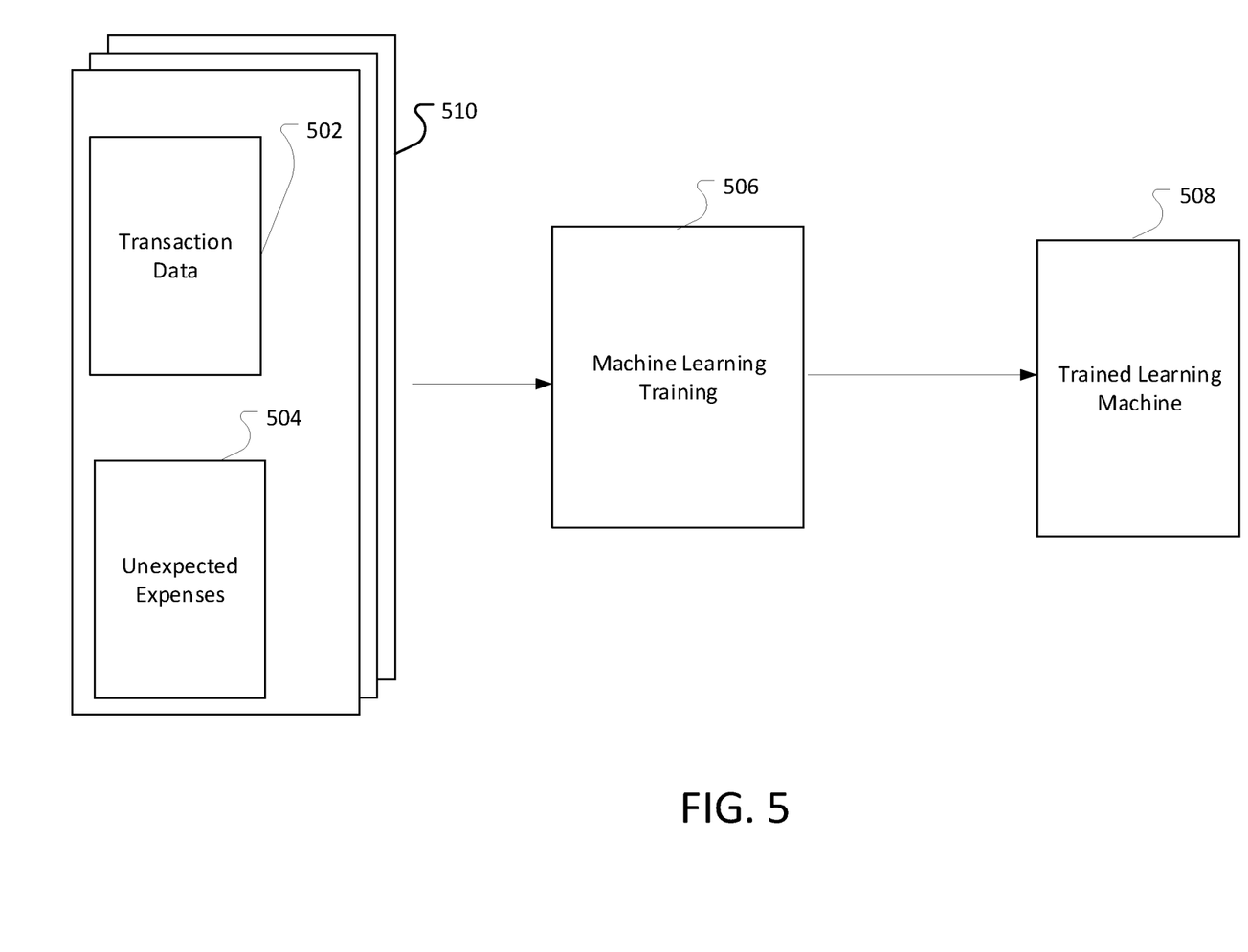
FIG. 5 illustrates an example of training a machine-learning system.

FIG. 5 illustrates an example of training a machine-learning system. For example, training sets 510 may be created using a transaction history of individual in different financial situations. The training sets may include the transaction information 502 and details about unexpected expenses 504 that occurred for those individuals during the period of time for which training data is available. Using machine-learning techniques as described above, a model may be trained, by the machine-learning trainer 506, to determine the frequency and amount of unexpected expenses. In some implementations, a single trained learning machine 508 may be trained. In other implementations, multiple models may be trained based on financial circumstance.

In some implementations, a user may be categorized using another trained learning machine. For example, the users transaction history may be provided to a machine-learning system and the machine-learning system may identify a financial grouping for the user. That financial grouping may be used to identify an appropriate trained machine-learning model that can predict the likely frequency and amount of unexpected expenses.

Referring back to FIG. 4, once the frequency and amount of unexpected expenses is determined, the system recommends a savings plan (block 406). In some implementations, the recommended savings plan can account for the unexpected expense. In some implementations, the system 100 creates an additional category of savings to account for the unexpected expense (block 408). For example, the system 100 can suggest that the user save $70 a month in an emergency savings account. In some implementations, the system 100 automates savings for the unexpected expenses and other desired savings (as described further below with respect to goal setting.) The system 100 can automate a transfer from checking to savings based on the members average debt after a percentage of debt is agreed upon with the user (e.g., the user agrees to send 10% of a $200 debt to savings every 30 days after deposit).

In some implementations, the system 100 uses machine learning to learn the behavior of a user. For example, if the user always prefers to pay the full amount on their credit card statement, except when it includes significantly large purchases, the system 100 learns that behavior.

An example recommendation can include the following—
1. Scenario 1—Pay entire balance of $XX.XX
2. Scenarios 2—Pay partial balance of $YY.YY The system 100 can monitor the age of children/vehicles/houses of the user and predict certain expenses based on these factors. An example recommendation based on these factors can include the following—

Age 17+—College Expenses next year!
Car is 6-year-old—Time to buy a new one!

The system 100 can continuously monitor data corresponding to the member and identify patterns. For example, the data can include the user's geo-location, data access patterns, money usage, weather data, and the system 100 can identify patterns within this data to determine a recommendation.

In some implementations, the system 100 can provide goal setting recommendations to the user. Goal setting can be an interactive user experience that identifies what's most subjectively valuable to a user. For example, some users may wish to save to support an earlier retirement, while other users may be willing to work longer in order to enjoy more today. Once goals are established, the system 100 assists the user to allocate any excess cash flow in order to reach their goals. Goals can be tracked to Checking, Savings or Pseudo Savings (for example, emergency cash staches).

In some implementations, the system 100 includes or interacts with a real-time risk-management engine. The system 100 can have a risk management engine that determines what to do in the case of a cash flow shortfall. For example, the system 100 may, with the permission of the user (which may be provided in advance), draw on a line of credit. Additionally, or alternatively, the system 100 can determine to provide warnings using a computing device of the user. The system 100 can also attempt to restructure the current financial situation of the user and determine whether it can be improved. The system 100 can determine the user is not able to stay in the program as they are unable or unwilling to meet the financial constraints the system proposes.

In some implementations, the user can approve or modify the algorithmically suggested amount to be paid above the minimum payment and the system 100 will offer multiple debt reduction automation options. Examples, of algorithms include: Debt snowball (highest interest paid off first), debt avalanche (lowest balance paid first) or a custom option all to be automatically paid according to a pre-agreed upon plan with the user."

In some implementations, the mathematical algorithm used includes to following:

Disposable Income=Income−(Recurring transaction cashflow+Debt re-payment+savings transfer+ goals transfer+manual/other transfers)

All adjustable by time increment (daily, weekly, bi-weekly, 1st and 15th, monthly, quarterly or yearly)

The risk engine can monitor the forecasted cash flow to determine if real time spending threatens the above pre-agreed upon plan.

A messaging component may be used to cause money to be transferred and bills to be paid, wth the user's permission either in advance or at the time of payment. In some implementations, the message is a one way message (for example, sending directives to move money from one account to another, sending notifications to clients, etc.). However the messaging can be a two-way message capable of receiving directives from the client, answer queries from the client, and so forth.

Embodiments of the subject matter and the functional operations described in this specification can be implemented in digital electronic circuitry, tangibly-embodied computer software or firmware, computer hardware (including the structures disclosed in this specification and their structural equivalents), or in combinations of one or more of them. Embodiments of the subject matter described in this specification can be implemented as one or more computer programs (i.e., one or more modules of computer program instructions encoded on a tangible non-transitory program carrier for execution by, or to control the operation of, data processing apparatus). The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry (e.g., an FPGA (field programmable gate array) or an ASIC (application-specific integrated circuit)). In addition to hardware, the apparatus can optionally include code that creates an execution environment for computer programs (e.g., code that constitutes processor firmware, a protocol stack, a database management system, an operating system, or a combination of one or more of them).

A computer program, which can also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document, in a single file dedicated to the program in question, or in multiple coordinated files (e.g., files that store one or more modules, sub-programs, or portions of code)). A computer program can be deployed so that the program is executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), to name just a few).

Computer-readable media suitable for storing computer program instructions and data include all forms of non-volatile memory on media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user, for example, by sending web pages to a web browser on a user's device in response to requests received from the web browser, mobile devices, wearables, virtual reality and/or augmented (mixed) reality devices.

Embodiments of the subject matter described in this specification can be implemented in a computing system that includes a back-end component (e.g., as a data server), or that includes a middleware component (e.g., an application server), or that includes a front-end component (e.g., a client computer having a graphical user interface or a web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network (LAN) and a wide area network (WAN) (e.g., the Internet).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user device (e.g., for purposes of displaying data to and receiving user input from a user interacting with the user device), which acts as a client. Data generated at the user device (e.g., a result of the user interaction) can be received from the user device at the server.

While this specification contains many specific implementation details, these should not be construed as limitations on the scope of any invention or on the scope of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

The invention claimed is:

1. A method implemented by a data processing system, comprising:
receiving training data including (i) transaction histories of a plurality of users during a specific period of time, and (ii) for each of the plurality of users, data specifying unexpected expenses that occurred to the respective user during the specific period of time;
training a neural network to predict an unexpected expense for a given transaction history using a supervised learning technique based on the training data, wherein the neural network is configured to receive as input the given transaction history and to process the input to generate an output that specifies a specified expense for the given transaction history, wherein the neural network comprises a plurality of artificial neurons that are connected through edges and are aggregated into a plurality of neural network layers comprising at least an input layer and an output layer, wherein each of the edges is configured to transmit a signal from one artificial neuron to another artificial neuron, and wherein an output of each of the plurality of artificial neurons is computed by a specified function of a sum of inputs of the artificial neuron in accordance with a plurality of weights;
setting values of the plurality of weights based on the training of the neural network;
receiving new data indicating a list of historic transactions of a particular user from a plurality of financial institutions;
processing, by the data processing system, the new data using the plurality of artificial neurons in the trained neural network in accordance with the values of the plurality of weights to identify at least one specified expense for the particular user, wherein the artificial neurons in the input layer are configured to receive the new data as input and the artificial neurons in the output layer are configured to generate a new output that identifies the at least one specified expense;
determining a plan to account for the at least one specified expense; and
automatically transferring, by the data processing system, an amount from a first account of the particular user to a second account of the particular user based on the plan.

2. The method of claim 1, further comprising:
identifying a set of recurring transactions based on the list of historic transactions;
identifying at least one transaction in the set of recurring transaction that is not being automatically paid; and
scheduling an automatic payment based on the at least one transaction.

3. The method of claim 2, wherein the scheduling is further based on the output from the trained neural network.

4. The method of claim 1, further comprising:
identifying one or more categories based on the list of historic transactions; and
establishing a hierarchy among the one or more categories.

5. The method of claim 4, further comprising enabling a user to adjust the hierarchy among the one or more categories.

6. The method of claim 1, further comprising creating a financial plan for the particular user based at least in part on output from the trained neural network.

7. A non-transitory computer storage medium encoded with computer program instructions that when executed by one or more computers cause the one or more computers to perform operations comprising:
receiving training data including (i) transaction histories of a plurality of users during a specific period of time, and (ii) for each of the plurality of users, data specifying unexpected expenses that occurred to the respective user during the specific period of time;
training a neural network to predict an unexpected expense for a given transaction history using a supervised learning technique based on the training data, wherein the neural network is configured to receive as input the given transaction history and to process the input to generate an output that specifies a specified expense for the given transaction history, wherein the neural network comprises a plurality of artificial neurons that are connected through edges and are aggregated into a plurality of neural network layers comprising at least an input layer and an output layer, wherein each of the edges is configured to transmit a signal from one artificial neuron to another artificial neuron, and wherein an output of each of the plurality of artificial neurons is computed by a specified function of a sum of inputs of the artificial neuron in accordance with a plurality of weights;
setting values of the plurality of weights based on the training of the neural network;
receiving new data indicating a list of historic transactions of a particular user from a plurality of financial institutions;
processing the new data using the plurality of artificial neurons in the trained neural network in accordance with the values of the plurality of weights to identify at least one specified expense for the particular user, wherein the artificial neurons in the input layer are configured to receive the new data as input and the artificial neurons in the output layer are configured to generate output that identifies the at least one specified expense;
determining a plan to account for the at least one specified expense; and automatically transferring an amount from a first account of the particular user to a second account of the particular user based on the plan.

8. The non-transitory computer storage medium of claim 7, the operations further comprising:
identifying a set of recurring transactions based on the list of historic transactions;
identifying at least one transaction in the set of recurring transaction that is not being automatically paid; and
scheduling an automatic payment based on the at least one transaction.

9. The non-transitory computer storage medium of claim 8, wherein the scheduling is further based on output from the trained neural network.

10. The non-transitory computer storage medium of claim 7, the operations further comprising:
identifying one or more categories based on the list of historic transactions; and
establishing a hierarchy among the one or more categories.

11. The non-transitory computer storage medium of claim 10, the operations further comprising enabling a user to adjust the hierarchy among the plurality of categories.

12. The non-transitory computer storage medium of claim 7, the operations further comprising creating a financial plan for the particular user based at least in part on output from the trained neural network.

13. A system comprising:
one or more computers and one or more storage devices storing instructions that are operable, when executed by the one or more computers, to cause the one or more computers to perform operations comprising:
receiving training data including (i) transaction histories of a plurality of users during a specific period of time, and (ii) for each of the plurality of users, data specifying unexpected expenses that occurred to the respective user during the specific period of time;
training a neural network to predict an unexpected expense for a given transaction history using a supervised learning technique based on the training data, wherein the neural network is configured to receive as input the given transaction history and to process the input to generate an output that specifies a specified expense for the given transaction history, wherein the neural network comprises a plurality of artificial neurons that are connected through edges and are aggregated into a plurality of neural network layers comprising at least an input layer and an output layer, wherein each of the edges is configured to transmit a signal from one artificial neuron to another artificial neuron, and wherein an output of each of the plurality of artificial neurons is computed by a specified function of a sum of inputs of the artificial neuron in accordance with a plurality of weights;
setting values of the plurality of weights based on the training of the neural network;
receiving new data indicating a list of historic transactions of a particular user from a plurality of financial institutions;
processing the new data using the plurality of artificial neurons in the trained neural network in accordance with the values of the plurality of weights to identify at least one specified expense for the particular user, wherein the artificial neurons in the input layer are configured to receive the new data as input and the artificial neurons in the output layer are configured to generate output that identifies the at least one specified expense;
determining a plan to account for the at least one specified expense; and
automatically transferring an amount from a first account of the particular user to a second account of the particular user based on the plan.

14. The system of claim 13, the operations further comprising:
identifying a set of recurring transactions based on the list of historic transactions;
identifying at least one transaction in the set of recurring transaction that is not being automatically paid; and
scheduling an automatic payment based on the at least one transaction.

15. The system of claim 14, wherein the scheduling is further based on output from the trained neural network.

16. The system of claim 13, the operations further comprising:
identifying one or more categories based on the list of historic transactions; and
establishing a hierarchy among the one or more categories.

17. The system of claim 16, the operations further comprising enabling a user to adjust the hierarchy among the one or more categories.

18. The system of claim 13, the operations further comprising creating a financial plan for the particular user based at least in part on output from the trained neural network.

* * * * *